(12) United States Patent
Sakuma

(10) Patent No.: US 11,117,114 B2
(45) Date of Patent: Sep. 14, 2021

(54) LITHIUM CARBONATE PRODUCTION DEVICE

(71) Applicant: ASAKA RIKEN CO., LTD., Koriyama (JP)

(72) Inventor: Yukio Sakuma, Koriyama (JP)

(73) Assignee: Asaka Riken Co., Ltd., Fukushima (JP)

( * ) Notice: Subject to any disclaimer, the term of this patent is extended or adjusted under 35 U.S.C. 154(b) by 0 days.

(21) Appl. No.: 17/057,851

(22) PCT Filed: Jun. 10, 2019

(86) PCT No.: PCT/JP2019/022920
§ 371 (c)(1),
(2) Date: Nov. 23, 2020

(87) PCT Pub. No.: WO2020/090145
PCT Pub. Date: May 7, 2020

(65) Prior Publication Data
US 2021/0197169 A1 Jul. 1, 2021

(30) Foreign Application Priority Data
Oct. 29, 2018 (JP) ............................. JP2018-202823

(51) Int. Cl.
| | | |
|---|---|---|
| *B01J 19/24* | (2006.01) | |
| *C01D 15/08* | (2006.01) | |
| *B01J 19/00* | (2006.01) | |
| *B01J 19/26* | (2006.01) | |
| *B01J 4/00* | (2006.01) | |

(52) U.S. Cl.
CPC ........... *B01J 19/2465* (2013.01); *B01J 4/002* (2013.01); *B01J 19/0013* (2013.01); *B01J 19/26* (2013.01); *C01D 15/08* (2013.01); *B01J 2219/00162* (2013.01); *B01J 2219/00177* (2013.01)

(58) Field of Classification Search
CPC ........ B01J 19/2465; B01J 19/26; B01J 4/002; B01J 2219/00162; B01J 2219/00177; C01D 15/08
See application file for complete search history.

(56) References Cited

U.S. PATENT DOCUMENTS 9,598,291 B2   3/2017 Chon et al.

FOREIGN PATENT DOCUMENTS

| JP | H08-217438 A | 8/1996 |
|---|---|---|
| JP | H11-310414 A | 11/1999 |
| JP | 4333234 B2 | 9/2009 |
| JP | 2012-091999 A | 5/2012 |
| JP | 2015-515440 A | 5/2015 |
| WO | 2013/151227 A1 | 10/2013 |

*Primary Examiner* — Lessanework Seifu
(74) *Attorney, Agent, or Firm* — Carrier Blackman & Associates, P.C.; Joseph P. Carrier; William D. Blackman

(57) ABSTRACT

A lithium carbonate production device is provided which can efficiently produce lithium carbonate without requiring a large pressure for supplying carbon dioxide gas, by a simple structure. A lithium carbonate production device (1) includes: a sealed reaction tank (2) which stores a lithium hydroxide aqueous solution A; a supply unit (3) for the lithium hydroxide aqueous solution; a carbon dioxide gas supply unit (4); a circulation unit (21) for the lithium hydroxide aqueous solution; and a nozzle which is provided at the head of the circulation unit (21) for the lithium hydroxide aqueous solution, and has a diameter which gradually decreases from a base end side to a head side.

3 Claims, 2 Drawing Sheets

LITHIUM CARBONATE PRODUCTION DEVICE

TECHNICAL FIELD

The present invention relates to a lithium carbonate production device.

BACKGROUND ART

Conventionally, a lithium carbonate production device has been known that stores a liquid to be treated in which lithium ions are dissolved in an aqueous solvent in a reaction chamber, and blows carbon dioxide gas into the liquid to be treated to form bubbles therein; and on the other hand, forms a gas-filled layer filled with unreacted carbon dioxide gas after the bubbling, on the liquid surface of the liquid to be treated, pumps up the liquid to be treated in the reaction chamber, and sprays the liquid onto the gas-filled layer (see Patent Literature 1, for example).

In the above production device, carbon dioxide gas is bubbled into the liquid to be treated, and thereby lithium ions contained in the liquid to be treated react with the carbon dioxide gas to form lithium carbonate. The carbon dioxide gas which has not reacted with the lithium ions by the bubbling forms a gas-filled layer on a liquid surface of the liquid to be treated; and by the treatment liquid being drawn up from the reaction chamber, and being sprayed onto the gas-filled layer, reacts with lithium ions contained in the liquid to be treated to further form lithium carbonate.

Accordingly, according to the production device, it is possible to efficiently produce lithium carbonate without wasting the carbon dioxide gas that did not react with the lithium ion by the bubbling.

CITATION LIST

Patent Literature

Patent Literature 1: Japanese Patent No. 4333234

SUMMARY OF INVENTION

Technical Problem

However, in the lithium carbonate production device described in Patent Literature 1, there are such disadvantages that a large pressure is required in order to blow carbon dioxide gas into the liquid to be treated to form bubbles therein, and besides the supplied carbon dioxide gas cannot sufficiently react with lithium ions contained in the liquid to be treated, in some cases.

An object of the present invention is to provide a lithium carbonate production device which resolves the disadvantages, can supply carbon dioxide gas without requiring a large pressure, and efficiently produce lithium carbonate from the supplied carbon dioxide gas, by a simple structure.

Solution to Problem

In order to achieve this object, the lithium carbonate production device of the present invention comprises: a sealed reaction tank that stores a lithium hydroxide aqueous solution; a supply unit for the lithium hydroxide aqueous solution, which supplies the lithium hydroxide aqueous solution to the reaction tank; a carbon dioxide gas supply unit that supplies carbon dioxide gas to a space above a liquid surface of the lithium hydroxide aqueous solution in the reaction tank; a circulation unit for the lithium hydroxide aqueous solution, which circulates the lithium hydroxide aqueous solution that is stored in the reaction tank, through the reaction tank, drops the lithium hydroxide aqueous solution from above the liquid surface of the lithium hydroxide aqueous solution into the lithium hydroxide aqueous solution in the reaction tank, entrains carbon dioxide gas in the reaction tank into a stream of the lithium hydroxide aqueous solution, introduces the carbon dioxide gas into the lithium hydroxide aqueous solution that is stored in the reaction tank, and causes the carbon dioxide gas to react with the lithium hydroxide aqueous solution to form lithium carbonate; and a nozzle that is provided at a head of the circulation unit for the lithium hydroxide aqueous solution, and has a diameter which decreases gradually from a base end side to a head side.

In the production device of the present invention, firstly, the supply unit for the lithium hydroxide aqueous solution supplies a predetermined amount of the lithium hydroxide aqueous solution to the reaction tank. Next, the carbon dioxide gas supply unit that supplies carbon dioxide gas to the reaction tank supplies the carbon dioxide gas to the reaction tank. At this time, the carbon dioxide gas supply unit supplies carbon dioxide gas to the space above the liquid surface of the lithium hydroxide aqueous solution in the reaction tank, and accordingly can supply carbon dioxide gas at a lower pressure than the case where carbon dioxide gas is supplied into the lithium hydroxide aqueous solution to form bubbles therein.

In the production device of the present invention, next, the circulation unit for the lithium hydroxide aqueous solution circulates the lithium hydroxide aqueous solution stored in the reaction tank through the reaction tank, and drops the lithium hydroxide aqueous solution into the lithium hydroxide aqueous solution from above the liquid surface of the lithium hydroxide aqueous solution, in the reaction tank. At this time, because the nozzle having the diameter which gradually decreases from the base end side to the head side is provided at the head of the circulation unit for the lithium hydroxide aqueous solution, the lithium hydroxide aqueous solution that is circulated by the circulation unit for the lithium hydroxide aqueous solution results in being discharged vigorously from the nozzle, and falling into the lithium hydroxide aqueous solution which is stored in the reaction tank.

As a result, the lithium hydroxide aqueous solution that is discharged from the nozzle entrains the carbon dioxide gas in the reaction tank due to the force thereof, and results in introducing the carbon dioxide gas into the lithium hydroxide aqueous solution stored in the reaction tank; and the introduced carbon dioxide gas reacts with lithium hydroxide, which thereby can efficiently produce lithium carbonate.

In addition, in the production device of the present invention, the reaction tank is sealed, and accordingly, the supplied carbon dioxide gas is not wasted; the lithium hydroxide aqueous solution stored in the reaction tank is stirred by the lithium hydroxide aqueous solution that is discharged from the nozzle, and accordingly a stirring device is not needed; and the production device becomes a simple structure and can efficiently produce the lithium carbonate.

In addition, in the production device of the present invention, it is preferable that the reaction tank comprises a pressure detecting unit which detects a pressure of carbon dioxide gas stored in the reaction tank, and the carbon dioxide gas supply unit comprises an on-off valve which opens and closes in response to the pressure of the carbon dioxide gas detected by the pressure detecting unit.

In the production device of the present invention, the reaction tank is sealed, and accordingly in the case where the reaction tank comprises the pressure detecting unit, and the carbon dioxide gas supply unit comprises the on-off valve, when the carbon dioxide gas in the reaction tank is consumed by the reaction with lithium hydroxide, the pressure detecting unit detects a decrease in the pressure, and the on-off valve is opened and closed in response to the detected pressure. Accordingly, the pressure of the carbon dioxide gas in the reaction tank can be maintained within a predetermined range, and lithium carbonate can be produced further efficiently. As the on-off valve, for example, a solenoid valve can be used.

In addition, in the production device of the present invention, it is preferable that the reaction tank comprises a pH detecting unit that detects a pH of the lithium hydroxide aqueous solution stored in the reaction tank. The lithium hydroxide aqueous solution is strongly alkaline and has a high pH value, but the pH gradually decreases as lithium carbonate is formed. Then, the reaction tank that comprises the pH detecting unit can easily know the end time of the reaction, due to the pH detecting unit which detects the pH of the lithium hydroxide aqueous solution.

DESCRIPTION OF EMBODIMENTS

Next, an embodiment of the present invention will be described in more detail with reference to the accompanying drawings.

Figure 1:
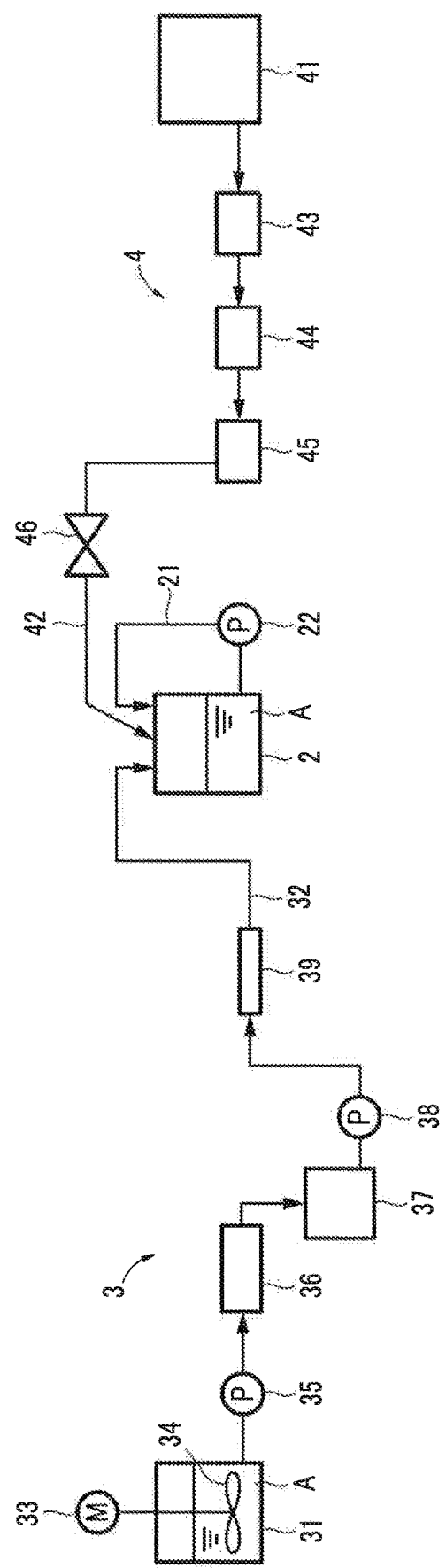
FIG. 1 is an explanatory view showing a lithium carbonate production device in the present invention.

As is shown in FIG. 1, a lithium carbonate production device 1 of the present embodiment comprises: a sealed reaction tank 2 which stores a lithium hydroxide aqueous solution A; a supply unit 3 for the lithium hydroxide aqueous solution, which supplies the lithium hydroxide aqueous solution A to the reaction tank 2; and a carbon dioxide gas supply unit 4 which supplies carbon dioxide gas to the reaction tank 2.

The supply unit 3 for the lithium hydroxide aqueous solution comprises: a dissolving tank 31 which prepares a lithium hydroxide aqueous solution A, by dissolving lithium recovered from used lithium ion secondary batteries or the like, in ion-exchanged water; and a supply conduit 32 which supplies the lithium hydroxide aqueous solution A obtained in the dissolving tank 31, to the reaction tank 2. The dissolving tank 31 comprises a stirring blade 34 which is rotationally driven by a motor 33 and stirs lithium and ion-exchanged water. In addition, in a middle of the supply conduit 32, there are provided a first pump 35, a filter press 36, a filtration tank 37, a second pump 38 and a microfiltration device 39, in this order from the dissolving tank 31 side.

The carbon dioxide gas supply unit 4 comprises a carbon dioxide gas cylinder 41 as a carbon dioxide gas supply source; and a carbon dioxide gas conduit 42 which supplies carbon dioxide gas from the carbon dioxide gas cylinder 41 to the reaction tank 2. In a middle of the carbon dioxide gas conduit 42, there are provided a regulator 43, a sulfuric acid tank 44, a pure water tank 45 and a solenoid valve 46, in order from the carbon dioxide gas cylinder 41 side.

Figure 2:
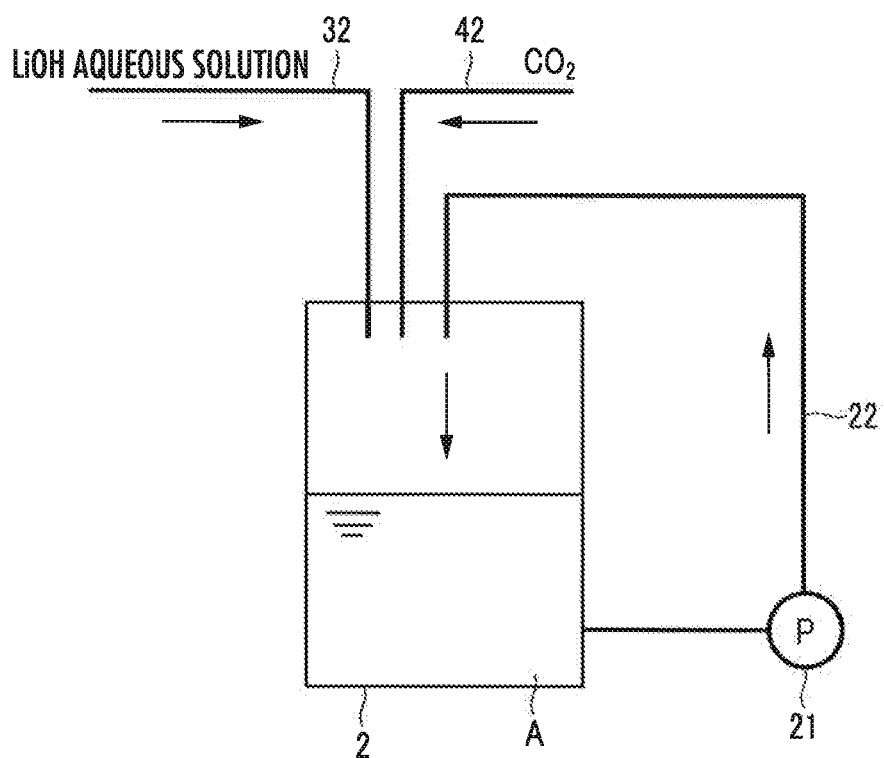
FIG. 2 is an explanatory cross-sectional view showing one example of the structure of a reaction tank in the lithium carbonate production device in the present invention.

As is shown in FIG. 2, the reaction tank 2 comprises: a circulation conduit 21 as a circulation unit for the lithium hydroxide aqueous solution, which is provided outside; and a circulation pump 22 which is provided in a middle of the circulation conduit 21. One end portion of the circulation conduit 21 is connected to the bottom of the reaction tank 2; and on the other hand, the other end portion is inserted into the reaction tank 2 from the top face of the reaction tank 2, and is opened above the liquid surface of the lithium hydroxide aqueous solution A which is stored in the reaction tank 2. In addition, the circulation conduit 21 comprises a nozzle (not shown) at the end portion which opens above the liquid surface of the lithium hydroxide aqueous solution A, and the diameter of the nozzle gradually decreases from the base end side to the head side.

In addition, an end portion of the supply conduit 32 and an end portion of the carbon dioxide gas conduit 42 are inserted in the top face of the reaction tank 2, and both of them are opened above the liquid surface of the lithium hydroxide aqueous solution A which is stored in the reaction tank 2.

Furthermore, the reaction tank 2 comprises: an atmosphere release valve (not shown) which releases gas in the reaction tank 2 into the atmosphere; a pressure sensor (not shown) as a pressure detecting unit which detects the pressure of the carbon dioxide gas stored in the reaction tank 2; and a pH meter (not shown) as a pH detecting unit which detects the pH of the lithium hydroxide aqueous solution A stored in the reaction tank 2.

Next, an operation of the lithium carbonate production device 1 of the present embodiment will be described.

When lithium carbonate is produced by the lithium carbonate production device 1, firstly, the lithium hydroxide aqueous solution A is taken out from the dissolving tank 31, and is supplied to the reaction tank 2 through the supply conduit 32. At this time, in the reaction tank 2, the air release valve is opened, and thereby the lithium hydroxide aqueous solution A can be easily supplied.

Next, carbon dioxide gas is supplied from the carbon dioxide gas cylinder 41 to the space above the liquid surface of the lithium hydroxide aqueous solution A in the reaction tank 2, through the carbon dioxide gas conduit 42. At this time, in the reaction tank 2, the air release valve is opened, and thereby, the air stored in the space can be replaced with carbon dioxide gas supplied through the carbon dioxide gas conduit 42, and the space can be filled with carbon dioxide gas.

After the space above the liquid surface of the lithium hydroxide aqueous solution A is filled with carbon dioxide gas, the circulation pump 22 is operated to circulate the lithium hydroxide aqueous solution A stored in the reaction tank 2, in the reaction tank 2 through the circulation conduit 21, and to drop the lithium hydroxide aqueous solution A, into the lithium hydroxide aqueous solution A, from above the liquid surface of the lithium hydroxide aqueous solution A. At this time, because a nozzle (not shown) is provided at the end portion of the circulation conduit 21, which opens above the liquid surface of the lithium hydroxide aqueous solution A, the lithium hydroxide aqueous solution A circulated through the circulation conduit 21 is discharged from the nozzle, forms a rod-shaped stream, and drops vigorously into the lithium hydroxide aqueous solution A stored in the reaction tank 2.

As a result, the carbon dioxide gas filled in the reaction tank 2 is entrained in the rod-shaped stream of the lithium hydroxide aqueous solution A, is introduced into the lithium hydroxide aqueous solution A stored in the reaction tank 2, and reacts with the lithium hydroxide to form lithium carbonate. In addition, the lithium hydroxide aqueous solution A stored in the reaction tank 2 results in being stirred by the rod-shaped stream falling from above, and accordingly, the production device can efficiently produce lithium carbonate without using a stirring device or the like.

When lithium carbonate is produced in this manner, carbon dioxide gas in the reaction tank 2 is consumed as lithium carbonate is formed, and the pressure thereof gradually decreases. Then, the lithium carbonate production device 1 of the present embodiment opens and closes the solenoid valve 46 provided in the carbon dioxide gas conduit 42, in response to the pressure of the carbon dioxide gas detected by the pressure sensor.

Specifically, the production device opens the solenoid valve 46 when the pressure of the carbon dioxide gas detected by the pressure sensor has reached a predetermined lower limit value due to the consumption of the carbon dioxide gas, and closes the solenoid valve 46 when the pressure of the carbon dioxide gas has reached a predetermined upper limit value due to the carbon dioxide gas supplied through the carbon dioxide gas conduit 42. By doing in this way, the production device can keep the pressure of the carbon dioxide gas in the reaction tank 2 in a predetermined range, and can produce lithium carbonate further efficiently.

When lithium carbonate is produced as in the above description, lithium hydroxide in the lithium hydroxide aqueous solution A which is stored in the reaction tank 2 is consumed as lithium carbonate is formed. Here, the lithium hydroxide aqueous solution A is strongly alkaline and has a high pH value; but as lithium carbonate is formed, lithium hydroxide is consumed, and the pH gradually decreases. Then, the reaction tank can easily know the end time of the reaction, due to the pH meter having detected that the pH of the lithium hydroxide aqueous solution A has reached a predetermined lower limit value.

REFERENCE SIGNS LIST

1 Lithium carbonate production device
2 Reaction tank
3 Supply unit for lithium hydroxide aqueous solution
4 Carbon dioxide gas supply unit
21 Circulation unit for lithium hydroxide aqueous solution.

The invention claimed is:

1. A lithium carbonate production device comprising:
    a sealed reaction tank that stores lithium hydroxide aqueous solution;
        a supply unit for the lithium hydroxide aqueous solution, which supplies the lithium hydroxide aqueous solution to the reaction tank;
        a carbon dioxide gas supply unit that supplies carbon dioxide gas to a space above a liquid surface of the lithium hydroxide aqueous solution in the reaction tank;
        a circulation unit for the lithium hydroxide aqueous solution, which circulates the lithium hydroxide aqueous solution that is stored in the reaction tank through the reaction tank, drops the lithium hydroxide aqueous solution from above the liquid surface of the lithium hydroxide aqueous solution into the lithium hydroxide aqueous solution in the reaction tank, entrains carbon dioxide gas in the reaction tank into a stream of the lithium hydroxide aqueous solution, introduces the carbon dioxide gas into the lithium hydroxide aqueous solution that is stored in the reaction tank, and causes the carbon dioxide gas to react with the lithium hydroxide aqueous solution to form lithium carbonate; and
        a nozzle that is provided at a head of the circulation unit for the lithium hydroxide aqueous solution, and has a diameter which decreases gradually from a base end side to a head side.

2. The lithium carbonate production device according to claim 1, wherein the reaction tank comprises a pressure detecting unit that detects a pressure of carbon dioxide gas stored in the reaction tank, and the carbon dioxide gas supply unit comprises an on-off valve which opens and closes in response to the pressure of the carbon dioxide gas detected by the pressure detecting unit.

3. The lithium carbonate production device according to claim 1, wherein the reaction tank comprises a pH detecting unit that detects a pH of the lithium hydroxide aqueous solution stored in the reaction tank.

* * * * *